W. L. HOPPER.
Cultivators.
No. 156,159. Patented Oct. 20, 1874.
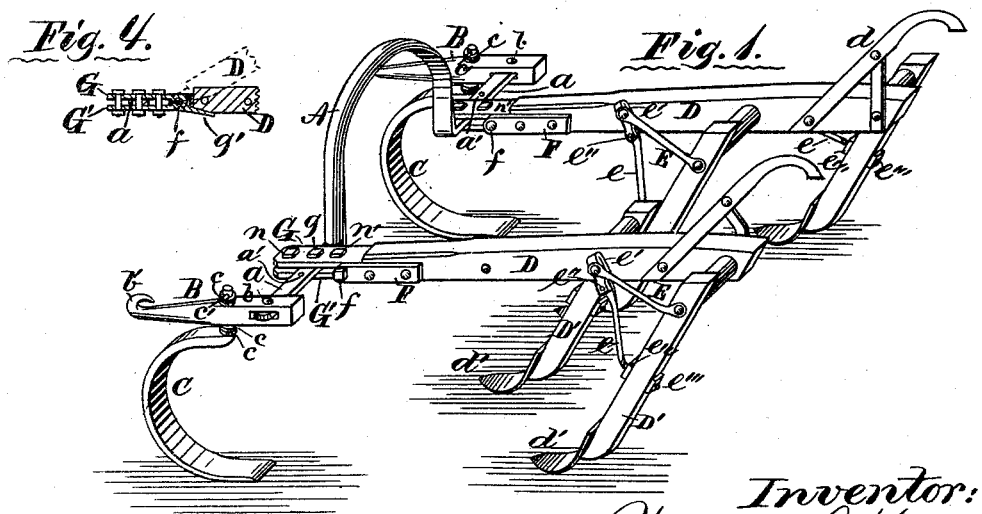

UNITED STATES PATENT OFFICE.

WILLIAM L. HOPPER, OF MONMOUTH, ILLINOIS.

IMPROVEMENT IN CULTIVATORS.

Specification forming part of Letters Patent No. 156,159, dated October 20, 1874; application filed August 10, 1874.

*To all whom it may concern:*

Be it known that I, WILLIAM L. HOPPER, of Monmouth, county of Warren and State of Illinois, have invented certain Improvements in Cultivators, of which the following is a specification:

This invention relates to improvements in that class of cultivators generally known as straddle-row cultivators without tongues or poles; and the invention consists in supporting the ends of the axle upon runners, which are journaled in the draft-bars, which are in turn journaled upon the ends of the axle, the plow-beams being also hinged to the axle, so as to admit of independent freedom of movement of the parts, all as hereinafter fully described.

To enable others skilled in the art to make and use my invention, I will now proceed to describe the same with reference to the annexed drawing, in which—

Figure 1 is a perspective view of a machine embodying my improvements. Fig. 2 is a top or plan view. Fig. 3 is a side elevation of one of the runners and draft-bar; and Fig. 4 is a vertical sectional view of one of the beam-coupling joints on the line $x\ x$ at Fig. 2.

The similar letters used as marks of reference apply to the like parts in all the figures.

Letter A represents the axle with an elevated central part, A, and horizontal ends $a\ a$. B B are the draft-plates, their rear ends perforated to receive the ends $a$ of the axle, to which they are journaled by a bolt, $b$, and their forward ends turned up to form hooks $b'\ b'$, to which the draft animals are attached. C C are runners, their lower ends curved and formed as shown in the drawings, and their upper ends straight and rounded as journals, and have bearings in holes in the bars B, through which they pass. $c\ c$ are washers, series of which may be placed on the journaled upper end of the runners C, above and below the bars B, for the purpose of adjusting the height of the bars B, and with them the axle A relatively to the runners. $c'$ are pins for retaining the runners in the bars B. D D are the plow-beams, carrying the ordinary handles $d\ d$, standards $D'$, and shovels $d'$. E are the upper braces for the standards $D'$. $e$ are the lower braces for the same. The upper ends of the braces $e$ are received between the ends of a bent plate, $e'$, to which it is attached by the ordinary wooden break-pin $e''$, and their lower ends are threaded and pass through the standards $D'$, on each side of which they are provided with nuts $e'''\ e'''$. F F are the beam-plates, one secured to each side of a beam, D, and their projecting forward ends connected by a bolt, $f$. G G' are plates, one above and one below an arm, $a$, of the axle, to which they are journaled by a bolt, $g$, and on which they may be adjusted in distance apart by use of the series of holes $a'$. The adjacent faces and rear ends of the plates G G' have transverse grooves, which receive the bolt $f$ between them, and are retained by bolts $n\ n'$. The bolt $n'$ may be tightened to compensate for wear of the bolt $f$. The plate G' has a rearward and slightly downward extension, $g'$, as shown at Fig. 4, which allows the beam D to be raised and oscillated on the bolt $f$ as a fulcrum, as shown by dotted lines at the same figure, but striking the lower side of the beam, as shown by full lines, will support the axle from falling forward. The axle or connecting yoke for the beams, as stated, is sustained or supported upon the runners C, which runners being journaled in the draft-plates B, and the draft-plates B being journaled to the axle A, will allow of the draft-plates oscillating laterally without disturbing the runners, and the runners to swing around or rotate on their journals without disturbing the draft-plates, thus steadying the running of the plows and facilitating the operation of turning at the ends of the rows. The depth of penetration of the plows, or method of adjusting the same, and method of adjusting the angularity of the standards to the beams has been hereinbefore explained. The lateral movement of the beams is on the bolt $g$, as shown by dotted lines at Fig. 2, and the vertical movement on the bolt $f$, as shown by dotted lines at Fig. 4. The axle is supported from falling forward, as already herein described, and from falling rearward by the runners C.

I claim—

The combination of the rigid axle A, beams D D, couplings G G, draft-plates B B, and runners C C, the runners journaled in the draft-plates, the draft-plates pivoted to the axle, and the beams having free vertical and lateral motion, all operating as and for the purpose specified.

WILLIAM L. HOPPER.

Witnesses:
 WILLIAM MARSHALL,
 JOHN C. DUNBAR.